United States Patent [19]

Meeks et al.

[11] 3,971,883

[45] July 27, 1976

[54] SILICONE RUBBER-ETHYLENE VINYL ACETATE ADHESIVE LAMINATES AND PREPARATION THEREOF

[75] Inventors: Lawrence A. Meeks, Cincinnati; James W. Biggs, Lebanon, both of Ohio

[73] Assignee: National Distillers and Chemical Corporation, New York, N.Y.

[22] Filed: Sept. 12, 1975

[21] Appl. No.: 612,595

[52] U.S. Cl. .................... 174/120 SR; 106/287 S; 106/287 SB; 156/51; 156/308; 156/326; 156/283; 156/315; 156/329; 174/120 AR; 264/174; 338/214; 427/118; 427/204; 427/407; 427/120; 427/400; 428/383; 428/446; 428/391; 428/451
[51] Int. Cl.² .................... H01B 7/00; C09J 5/02; B32B 13/12
[58] Field of Search ............... 156/51, 52, 283, 305, 156/307, 308, 313, 315, 326, 327, 329, 331, 332; 427/117, 118, 120, 203, 204, 302, 409, 333, 337, 340, 387, 344, 400, 407; 428/424, 446, 447, 448, 450, 451, 543, 383, 390, 391; 264/174; 338/214; 174/110 S, 120 SR, 120 AR; 260/448.2 R, 348 SC; 106/287 S, 287 SB

[56] References Cited
UNITED STATES PATENTS

| | | | |
|---|---|---|---|
| 2,523,037 | 9/1950 | Mathes | 427/204 |
| 3,306,800 | 2/1967 | Plueddemann | 156/330 |
| 3,318,717 | 5/1967 | Simpson | 106/287 SB |
| 3,379,607 | 4/1968 | Foster et al. | 428/447 |
| 3,433,891 | 3/1969 | Zysk et al. | 427/120 |
| 3,505,099 | 4/1970 | Neuroth | 428/447 |
| 3,542,585 | 11/1970 | Heit | 428/447 |
| 3,576,024 | 4/1971 | Atwell | 260/448.8 R |
| 3,650,808 | 3/1972 | Gagnon | 428/451 |
| 3,667,993 | 6/1972 | Stevenson | 428/447 |
| 3,799,838 | 3/1974 | Shaw et al. | 156/329 |

*Primary Examiner*—Douglas J. Drummond
*Assistant Examiner*—J. J. Gallagher
*Attorney, Agent, or Firm*—Kenneth D. Tremain

[57] ABSTRACT

Crosslinkable ethylene-vinyl acetate copolymer resins are rendered amenable to forming adherent laminates with cross-linkable silicone rubber by dusting the surface of either the resin or rubber, or both, with a bonding agent.

19 Claims, No Drawings

SILICONE RUBBER-ETHYLENE VINYL ACETATE ADHESIVE LAMINATES AND PREPARATION THEREOF

BACKGROUND OF THE INVENTION

Electrical ignition wires are essentially comprised of a central conductor such as copper wire surrounded by an insulating material. Crosslinked silicone rubber is desirable as the insulating material because it has appropriate electrical insulating properties and provides resistance to degradation by oil, water, heat and atmospheric conditions encountered surrounding an internal combustion engine. Unfortunately the silicone rubber is relatively expensive and the stiffness and tensile strength properties of the crosslinked material on the copper conductor are inadequate for this application.

Ethylene-vinyl acetate resins have appropriate electrical insulating properties for use in ignition wires and have satisfactory mechanical strength properties. Since the ethylene-vinyl acetate resins do not have the same oil, water, heat and oxidative resistance characteristics as the crosslinked silicone rubber, it is apparent that an ignition wire having a central copper conductor surrounded by a crosslinked ethylene-vinyl acetate resin which in turn is surrounded by crosslinked silicone rubber would combine the desirable characteristics of the two polymer materials and overcome the foregoing problems. Unfortunately, the adhesion of crosslinked ethylene-vinyl acetate resins to crosslinked silicone rubber is marginal at best.

Accordingly, it is the object of this invention to provide a method by which the bonding of crosslinked ethylene-vinyl acetate resins to crosslinked silicone rubber is improved so that superior electrical insulated products can be achieved. This and other objects of the invention will become apparent to those skilled in the art from the following detailed description.

SUMMARY OF THE INVENTION

This invention relates to a method for improving the adhesion between crosslinked ethylene-vinyl acetate resins and crosslinked silicone rubbers and to the resulting electrical insulated products. More particularly, the invention relates to a method of improving the bonding of crosslinked ethylene-vinyl acetate to crosslinked silicone rubber by dusting the surface of the resin and/or the rubber with a bonding agent prior to adhering the ethylene-vinyl acetate to the silicone rubber and prior to crosslinking the two plastic materials.

DESCRIPTION OF THE PREFERRED EMBODIMENTS

The ethylene-vinyl acetate resins and silicone rubber resin and the crosslinking agents therefor which are used in the present invention are well known in the art. Many such materials are commercially available and the individual identity of these materials does not constitute a feature of the present invention. Accordingly, they need not be described any further here.

In general, the ethylene-vinyl acetate and silicone rubbers are separately compounded with the usual fillers such as carbon black, clay, etc., and an appropriate crosslinking agent such as a peroxide. Layers of the two resins are thereafter placed together and cured by heating the composite laminate under pressure to an appropriate temperature at which the crosslinking is initiated.

It has been found that by dusting the surface of the ethylene-vinyl acetate resin or the silicone rubber, or both, with silica or silica admixed with a minor amount of a silane or a member of the class of compounds known as polyfunctional monomers, a satisfactory adhesion between the ethylene-vinyl acetate copolymer and the silicone rubber can be achieved after curing. The powdered bonding agent is applied to the surface by dusting, fluidized bed, powder spraying or any convenient manner such that there is about 0.00001–0.001 gram per square inch of surface, preferably about 0.00005–0.0005 gram per square inch of surface and most preferably about 0.0001 gram per square inch.

When a second bonding agent is admixed with the silica, it can be used in an amount from about 1–50%, preferably about 1–10% based on the weight of the silica. Among the silane agents which are useful in this invention, there can be mentioned vinyltris(beta methoxyethoxy)silane, gamma methacryloxypropyl trimethoxysilane, gamma aminopropyl trimethoxysilane, and silane coupling agents which contain both a cationic amine function as well as styryl reactivity, an example of which is the silane sold by Dow Corning Corp. under the name Z-6032 and having the formulas

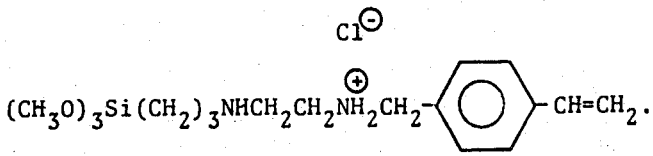

Other Dow Corning silanes useful in this invention are Z-6020, Z-6040 and Z-6076 and having the formulas $(CH_3O)_3Si(CH_2)_3NHCH_2CH_2HN_2$,

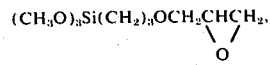

and $(CH_3O)_3Si(CH_2)_3Cl$, respectively.

The polyfunctional monomer promoting or bonding agents which have been found useful in the process of this invention are triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene, and triallyl phosphate.

The admixing of the bonding agent with the silica pigment can be accomplished in a Henschel mixer, a twin-cone blender, a Waring or similar type blender or any convenient fashion such that a thorough dispersion of the bonding agent with the silica pigment is obtained.

Various Examples are set forth below in order to further illustrate the invention. In these Examples, as well as throughout the specification and claims, all parts and percentages are by weight and all temperatures in degrees Centigrade unless otherwise specified.

EXAMPLE 1

An ethylene-vinyl acetate resin containing 17% vinyl acetate and having a melt index of 1.5 was compounded with 2 parts of vinyl-tris(beta methoxyethoxy)silane and a peroxide and a silicone rubber was separately compounded with a peroxide crosslinking agent. Uncured plaques of each resin were then prepared and the plaques pressed together and cured at 190° C. for 5 minutes. An attempt was made to measure the adhesive strength of one cured laminate on an Instron Peel Strength Tester but the adhesive strength was so poor that the values obtained were not meaningful. Thereafter, cured laminates were tested by hand and the adhesion rated as excellent, good, fair or poor.

EXAMPLE 2

The procedure of Example 1 was repeated except that before the plaques were pressed together, the surface of the ethylene-vinyl acetate was dusted with precipitated white amorphous silica powder and the excess removed so that there was about 0.0001 gram per square inch of the surface. The resulting cured laminate exhibited good adhesion.

EXAMPLES 3–12

Example 2 was repeated substituting an admixture of the silica and another bonding agent for the silica. The identity of the second bonding agent, amount of second bonding agent and resulting adhesion are set forth in the following Table. In each instance the admixture was prepared by mixing the silica and additional agent in a Waring blender.

TABLE

| Ex. | Second Bonding Agent | Amount | Adhesion |
| --- | --- | --- | --- |
| 3 | gamma aminopropyl triethoxysilane | 10% | Fair |
| 4 | trimethylolpropane trimethacrylate | 10% | Fair |
| 5 | triallyl isocyanurate | 5% | Fair |
| 6 | triallyl isocyanurate | 1% | Fair |
| 7 | Dow Silane Z 6031 | 10% | Fair |
| 8 | gamma methacryloxypropyl trimethoxysilane | 10% | Good |
| 9 | triallyl isocyanurate | 10% | Good |
| 10 | Dow Silane Z-6032 | 10% | Excellent |
| 11 | Dow Silane Z-6032 | 5% | Excellent |
| 12 | Dow Silane Z-6032 | 1% | Excellent |

The cured laminates of Examples 2, 9, 10, 11 and 12 were aged in an oven for 7 days at 160° C. No loss in adhesion was noted.

Various changes and modifications can be made in the process and products of this invention without departing from the spirit and the scope thereof. The various embodiments disclosed herein were for the purpose of further illustrating the invention but were not intended to limit it.

We claim:

1. A method of improving the bonding of crosslinked ethylene-vinyl acetate to crosslinked silicone rubber which comprises coating the surface of at least one of said ethylene-vinyl acetate and silicone rubber with a powdery bonding agent in an amount of about 0.00001–0.001 gram per square inch of surface area prior to adhering the ethylene-vinyl acetate to the silicone rubber and crosslinking the resulting laminate, wherein said bonding agent is silica or an admixture of silica and a member selected from the group of silane and polyfunctional monomer.

2. The method of claim 1 wherein said member is selected from the group consisting of vinyl-tris(beta methoxyethoxy)silane, gamma methacryloxypropyl trimethoxysilane,

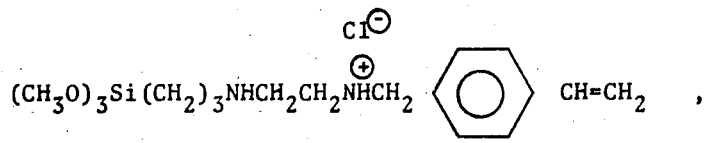

$(CH_3O)_3Si(CH_2)_3NHCH_2CH_2NH_2$, $(CH_3O)_3Si(CH_2)_3OCH_2\underset{O}{\overset{}{CHCH_2}}$, $(CH_3O)_3Si(CH_2)_3Cl$, triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene and triallyl phosphate.

3. The method of claim 2 wherein said surface is coated in an amount of about 0.00005–0.0005 gram per square inch of surface.

4. The method of claim 3 wherein said surface is coated in an amount of about 0.0001 gram per square inch of surface.

5. The method of claim 2 wherein said bonding agent is precipitated white amorphous silica.

6. The method of claim 2 wherein said bonding agent is an admixture of precipitated white amorphous silica and a silane.

7. A laminate comprising a crosslinked ethylene-vinyl acetate copolymer ply adhered to a ply of crosslinked silicone rubber, the interfacial surfaces of said plies being in contact with a powder bonding agent in an amount of 0.00001–0.001 gram per square inch of planar surface, said bonding agent being silica or an admixture of silica with a material selected from the group consisting of silane and polyfunctional monomer.

8. The laminate of claim 7 wherein said material is selected from the group consisting of vinyl-tris(beta methoxyethoxy)silane, gamma methacryloxypropyl trimethoxysilane,

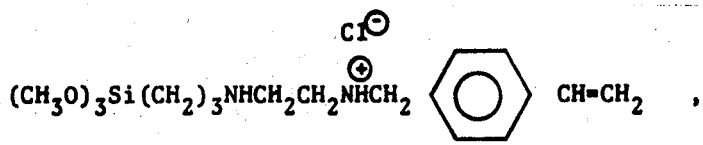

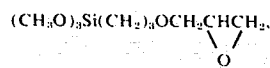

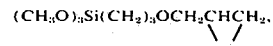

$(CH_3O)_3Si(CH_2)_3Cl$, triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene and triallyl phosphate.

9. The laminate of claim 8 wherein said amount is about 0.00005–0.0005 gram per square inch of planar surface.

10. The laminate of claim 9 wherein said amount is about 0.0001 gram per square inch of planar surface.

11. The laminate of claim 8 wherein said bonding agent is silica.

12. The laminate of claim 8 wherein said bonding agent is an admixture of silica and a silane.

13. An insulated ignition wire comprising a central conductor, a first insulating material surrounding the central conductor and a second insulating material surrounding the first insulating material and bonded thereto, wherein said first insulating material is crosslinked ethylene-vinyl acetate and said second insulating material is crosslinked silicone rubber and wherein the interfacial surfaces of said first and second insulating material are bonded by a powder bonding agent in an amount of 0.00001–0.001 gram per square inch of surface, said bonding agent being silica or a mixture of silica and a member of the group consisting of a silane and polyfunctional monomer.

14. The insulated ignition wire of claim 13 wherein said member is selected from the group consisting of vinyl-tris (beta methoxyethoxy)silane, gamma methacryloxypropyl trimethoxysilane,

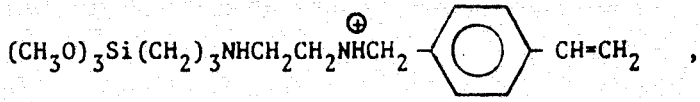

$(CH_3O)_3Si(CH_2)_3NHCH_2CH_2NH_2$,

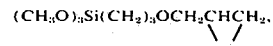

$(CH_3O)_3Si(CH_2)_3Cl$, triallyl cyanurate, triallyl isocyanurate, trimethylolpropane trimethacrylate, trimethylolpropane triacrylate, ethylene glycol dimethacrylate, diethylene glycol dimethacrylate, triethylene glycol dimethacrylate, tetraethylene glycol dimethacrylate, polyethylene glycol dimethacrylate, 1,4-butylene glycol dimethacrylate, 1,3-butylene glycol dimethacrylate, diethylene glycol diacrylate, triethylene glycol diacrylate, 1,4-butylene glycol diacrylate, allyl methacrylate, diallyl fumarate, divinyl benzene and triallyl phosphate.

15. The insulated ignition wire of claim 14 wherein said central conductor is copper.

16. The insulated ignition wire of claim 15 wherein said amount is about 0.00005–0.0005 gram per square inch of surface.

17. The insulated ignition wire of claim 16 wherein said amount is about 0.0001 gram per square inch of surface.

18. The insulated ignition wire of claim 15 wherein said bonding agent is silica.

19. The insulated ignition wire of claim 15 wherein said bonding agent is an admixture of silica and a silane.

* * * * *